United States Patent [19]
Ito

[11] 4,114,339
[45] Sep. 19, 1978

[54] STRUCTURE FOR COMBINING TWO BODIES AND SHEETING

[75] Inventor: Keizo Ito, Ichinomiya, Japan

[73] Assignee: Toyoda Gosei Co., Ltd., Japan

[21] Appl. No.: 792,014

[22] Filed: Apr. 28, 1977

[30] Foreign Application Priority Data

Apr. 30, 1976 [JP] Japan .................................. 51-50624
Apr. 30, 1976 [JP] Japan .............................. 51-55972[U]
Feb. 28, 1977 [JP] Japan .................................. 52-21007

[51] Int. Cl.$^2$ .............................................. E04B 1/38
[52] U.S. Cl. ...................................... 52/507; 24/214;
52/511; 85/5 R
[58] Field of Search ................. 52/507, 509, 511, 512,
52/717, 718; 24/214, 213, 81 R, 73 FT, 73 PM,
73 PF; 85/5 A, 80

[56] References Cited

U.S. PATENT DOCUMENTS

| | | | |
|---|---|---|---|
| 1,958,678 | 5/1934 | Place | 52/511 |
| 2,864,472 | 12/1958 | Fernberg | 24/73 FT |
| 3,742,671 | 7/1973 | Ellis | 52/507 |

FOREIGN PATENT DOCUMENTS

| | | | |
|---|---|---|---|
| 1,220,673 | 7/1966 | Fed. Rep. of Germany | 24/73 PM |
| 895,533 | 5/1962 | United Kingdom | 24/73 FT |
| 997,710 | 7/1965 | United Kingdom | 85/5 R |
| 1,234,965 | 6/1971 | United Kingdom | 85/5 R |

*Primary Examiner*—Ernest R. Purser
*Assistant Examiner*—Henry Raduazo
*Attorney, Agent, or Firm*—Armstrong, Nikaido, Marmelstein & Kubovcik

[57] ABSTRACT

Structure for combining a to-be-attached member with an attaching member and sheeting through a clip comprising an annular elastic head and one or a pair of elastic arms projectingly elongated from the center base portion of the elastic head and an engaging body having a supporting plate on the base portion, which projectingly elongated from both right and left sides of the back side of an engaging hole, wherein a to-be-attached hole is arranged on the to-be-attached member, the elastic head being fitted into the to-be-attached hole unmovably to the front and rear, with the supporting plate fitted unmovably to ups and downs and the elastic arm fitted into said engaging hole unmovably to the front and rear, and in case of combining the attaching member the same is made to be integral with the engaging body and in case of combining with sheeting a combining hole is punched on sheeting and the elastic head and supporting plate being inserted into the combining hole and sheeting being held between the to-be-attached member and the base portion larger than the combining hole of the engaging body.

7 Claims, 45 Drawing Figures

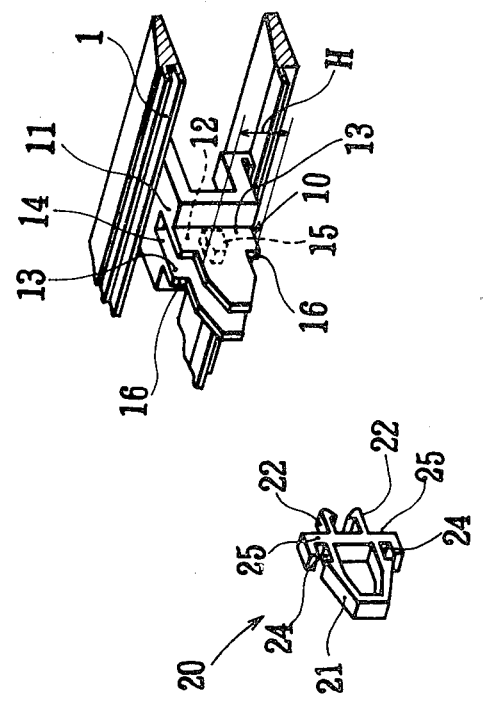
Fig. 4
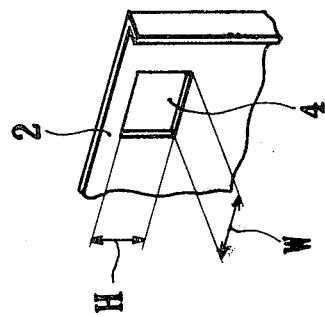

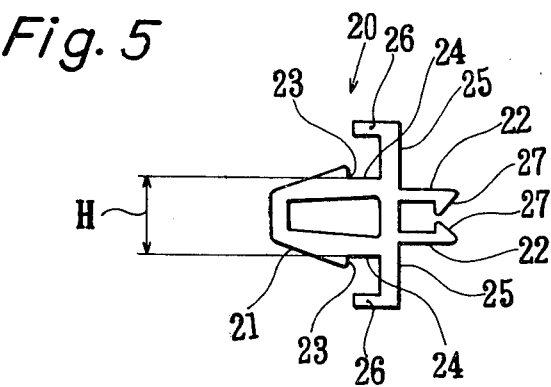
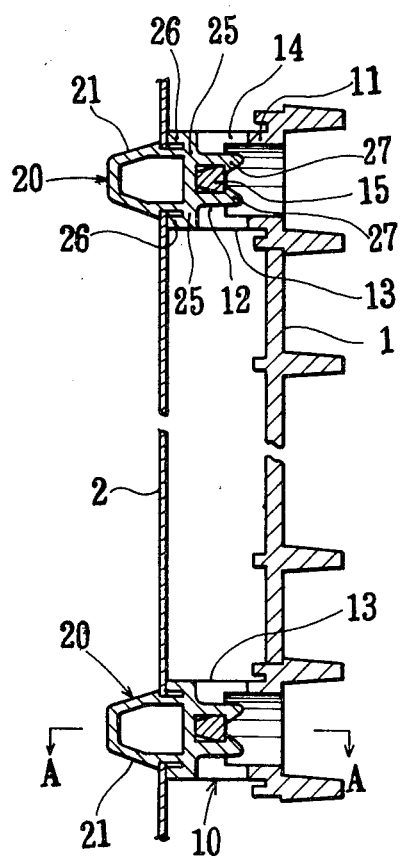

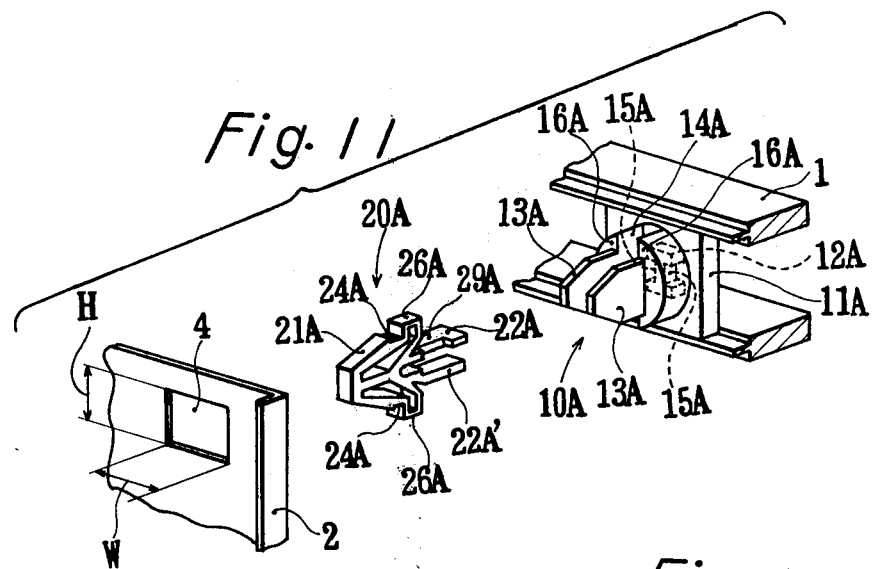
Fig. 11
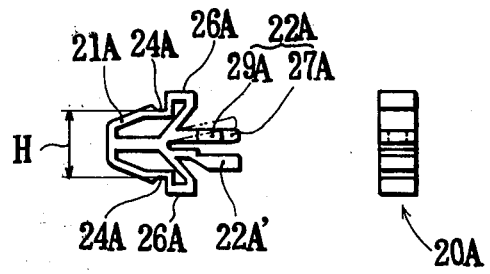
Fig. 12A    Fig. 12B
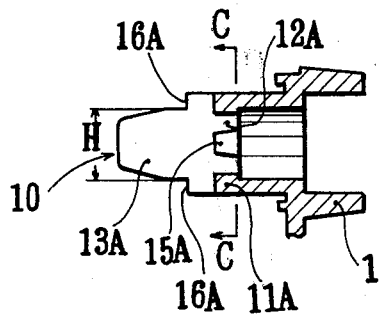 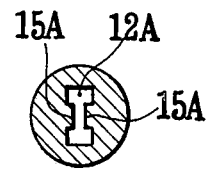
Fig. 13A    Fig. 13B

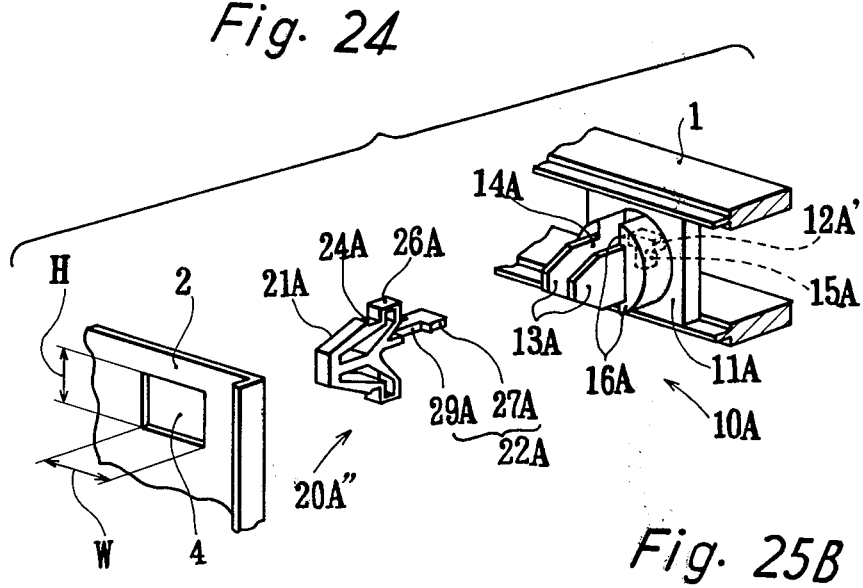
Fig. 24
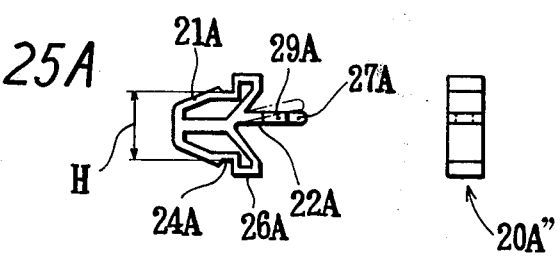
Fig. 25B
Fig. 25A
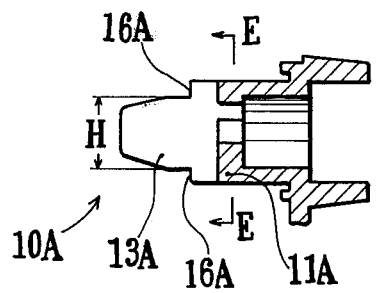
Fig. 26A
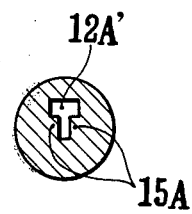
Fig. 26B

4,114,339

STRUCTURE FOR COMBINING TWO BODIES AND SHEETING

BACKGROUND OF THE INVENTION

The present invention relates to structure for combining two bodies, particularly suitable for attaching a plastic attaching member to a metal to-be-attached member and improvement thereof or combining sheeting, particularly suitable for attaching sheeting of long length to a metal to-be-attached member.

Due to difference in expansion rates between plastics and metal, when fully fitting the plastic attaching member into the metal to-be-attached member through screws, bolts and the like and combination being subjected to heat, plastics would deform or crack because they could not escape from expansion or contraction with full engagement of screws and bolts.

For instance, in case of attaching a plastic radiator grille 1 of an automobile to a metal bracket 2 of the body it has been general means so far to combine them through screw 3.

Being subjected to heat as aforementioned, the plastic radiator grille 1 tends to expand longitudinally, but because of full engagement with the screw, it can not escape expansion and deforms downward or upward 1A at between engaging portions as shown in FIG. 2.

And, in case of full engaging structure by means of screws and the like, with the lapse of time, the screw get rusty and if requiring to remove the grille it will be no longer possible to remove the grille with such a tool as a screw driver and will have to cut the screw with such tools as the drill and the like.

Moreover, the larger the grille the more the number of attaching screws has been required in attaching the grille, thus requiring as much working number in combining and resulting in bad productivity.

On the other hand, in case of attaching long soft sheeting to a metal bracket and the like of long length, a holding plate of long length and a washer of a large diameter have been required and much working number has been required for attaching and detaching thereof because attaching places therefor have been often difficult for using tools, drivers electrotool for mass productive combining.

Moreover, if the fitting is made of metal, it has been feared that it would have got rusty and the fine view would have been spoiled and detachment and attachment therefor would have been impossible.

SUMMARY OF THE INVENTION

In view of the aforementioned, the object of the present invention is to provide structure for combining two bodies which plastic attaching member can escape heat expansion and contraction thereof without causing deformation and cracking.

Another object of the present invention is to provide structure for combining two bodies, which facilitates, attaching and or detaching a plastic attaching member to and or from a to-be-attached member.

Further another object of the present invention is to provide structure for combining two bodies, if a plastic attaching member is attached to a to-be-attached member made of metal, which does not cause detachment impossible nor spoil a fine view thereof due to rust and the like.

Yet another object of the present invention is to provide structure for combining two bodies wich does not spoil a fine view and facilitates easy detachment if a plastic attaching member is attached to a to-be-attached member.

Yet further another object of the present invention is to provide structure for attaching sheeting to a to-be-attached member, which available of easy attachment and detachment to and or from the to-be-attached member.

Still further object of the present invention is to provide structure for attaching sheeting to a to-be-attached member made of metal, which does not cause detachment impossible nor spoil a fine view due to rust and the like.

Other objects will be clear with detail description and drawings below.

BRIEF DESCRIPTION OF THE DRAWINGS

FIG. 4 is a fragmentary perspective view showing structure of Example 1 of the present invention.

FIG. 5 is a side view of a clip of Example 1.

FIG. 6 is a sectional view showing a combining state in Example 1.

FIG. 11 is a fragmentary perspective view showing Example 2 of the present invention.

FIG. 12A is a side view of the clip in Example 2.

FIG. 12B is a elevation of the clip of FIG. 12A.

FIG. 13A is a sectional view showing integration of the grille and the engaging body in Example 2.

FIG. 13B is a sectional view through line C to C of FIG. 13A.

FIG. 24 is a fragmentary perspective view showing Example 4.

FIG. 25A is a side view of the clip in Example 4.

FIG. 25B is an elevation of the clip in Example 4.

FIG. 26A is a sectional view showing integration of the engaging body and the grille in Example 4.

FIG. 26B is a sectional view through line E to E.

DETAILED DESCRIPTION OF THE PREFERRED EMBODIMENTS OF THE INVENTION

Figure 1:
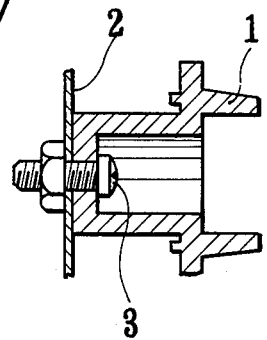
FIG. 1 is a sectional view showing conventional structure for combining a plastic radiator grille and a metal bracket.
Figure 2:
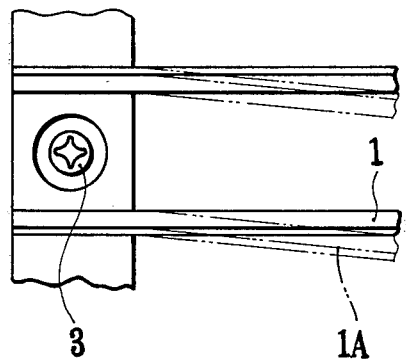
FIG. 2 is a partially elevation of FIG. 1.

Structure for combining two bodies of the present invention will be described taking the case of attaching a plastic radiator grille to a metal bracket as follows:

EXAMPLE 1

This example will be illustrated in FIGS. 4 to 10.

A radiator grille 1 is integrally provided with an engaging body 10 made of the same material as the radiator grill 1 at an appropriate spot on the back surface. As shown in FIG. 4, engaging body 10 is provided with an engaging hole 12 on a base portion 11 and at both right and left sides of engaging hole 12 a pair of supporting plates 13, 13 are projectively arranged with the face thereof perpendicularly placed interposing a clearance 14. Engaging hole 12 is provided with an engaging piece 15 which tapers backward at the approximately center portion and is connected to both sides. And supporting plates 13, 13 are tapered at their top ends and widened upwards and downwards at the base portion, thus having stopper stepped means 16, 16. Radiator grille 1 integrated with the engaging body 10 is combined with bracket 2 through plastic clips 20.

That is, as shown in FIGS. 4 and 5, clip 20 comprises an elastic head 21 which has width to fit into clearance 14 of engaging body 10, tapered at the top end and of closed ring and a pair of elastic arms 22, 22 projectingly elongated forwards from the center base portion of elastic head 21. On the upper and lower portion of elastic head 21 engaging concave means 24, 24 are formed with engaging stepped means 23, 23 arranged. At the top end base portions of elastic head 21 stopper means 25, 25 are symmetrically elongated and at the top end of stopper means 25, 25 stopper projection means 26, 26 are projectingly formed toward elastic head 21, wherein the length between engaging concave means 24, 24 shall be equal to the height H of supporting plate 13, 13. A pair of nails 27, 27 are arranged at the top end of the inside of elastic arms 22, 22.

Figure 3:
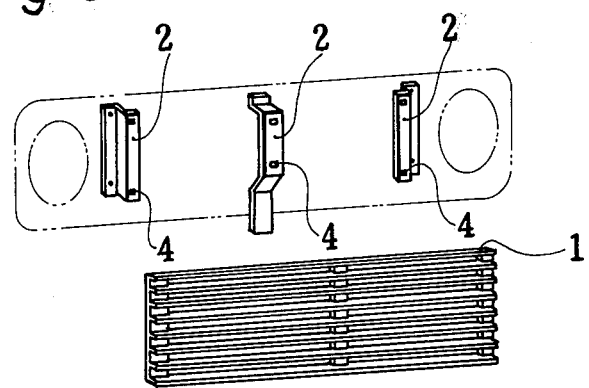
FIG. 3 is a separating perspective view showing a radiator grille and a body to-be-attached.
Figure 7:
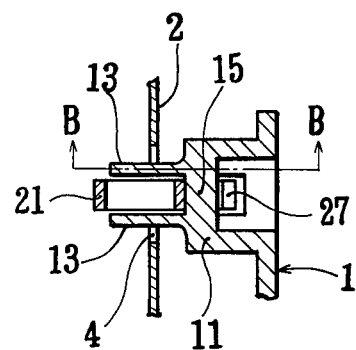
FIG. 7 is a sectional view through line A to A of FIG. 6.
Figure 8:
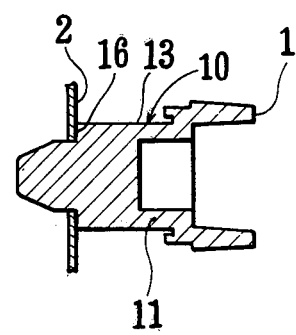
FIG. 8 is a sectional view through line B to B of FIG. 7.
Figure 9:
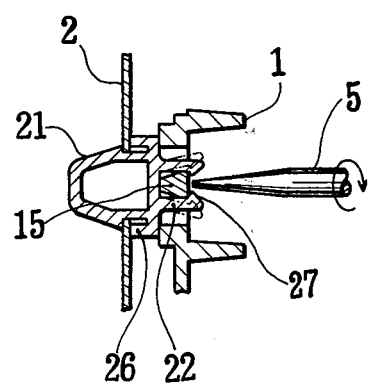
FIG. 9 is a sectional view for description of detaching the radiator grille in Example 1.

As shown in FIG. 3, metal bracket 2 is arranged at a position opposite to engaging body 10 integrated with the aforementioned radiator grille behind radiator grille 1 and arranged with a to-be-attached hole 4 of height H equal to that of supporting plate 13 of engaging body 10 by width longer than at least height H.

Now, attachment will be described for this example. First, clip 20 is inserted into clearance 14 of engaging body 10 integrated with radiator grille 1 from the side of elastic arms 22, 22, thereby nails 27, 27 of elastic arms 22, 22 are expanded by the slanting surface of engaging piece 15 and when elastic arms 22, 22 are bent toward the opposite direction and nails 27, 27 pass through engaging hole 12 of base portion 11, elastic arms 22, 22 are restored, engaging piece 15 is held by the front end wall of elastic head 21, elastic arms 22, 22 and nails 27, 27 and, clip 20 is engaged with engaging hole 12. And, clip 20 protrudes as much as the thickness of elastic head 21 beyond the circumferential edge of engaging body 10 and most of which is fitted into clearance 14 and held by supporting plate 13, 13. Thus, clip 20 is fitted into entire engaging body 10.

Then, with this state, elastic head 21 of clip 20 is forcibly pushed into to-be-attached hole 4 of bracket 2 just contacting with the upper and lower edges of the hole, ring form elastic head 21 bends against elasticity and enters into to-be-attached hole 4 and reaches engaging concave means 24, 24 elastic head 21 restores the original form and, engaging body 10 and clip 20 are fixed unmovably to the front and rear by engagement of engaging stepped means 23, 23 with the upper and lower edges of to-be-attached hole 4 and unmovably to ups and downs by engagement of supporting plates 13, 13 of engaging body 10 with the upper and lower edges of to-be-attached hole 4 and shakes to the front and rear is fully restricted by just contacting stopper stepped means 16, 16 of engaging body 10 with bracket 2.

Thus, when attachment of each clip 20 to to-be-attached hole 4 is completed, radiator grille 1 is securely held by bracket 2. After attachment, radiator grille 1 will no longer be detached unless otherwise elastic arms 22, 22 are forcibly deformed.

The loads in the upper, lower and horizontal directions upon radiator grille 1 attached as aforementioned are received by frictional fitting force with supporting plates 13, 13 of engaging body 10 and to-be-attached hole 4, so that the radiator grille will not be displaced or out of position due to vibration during running cars.

When the radiator grille is going to expand or contract to the longitudinal direction due to heat, clip 20 is integrally displaced in the direction of expansion or contraction of radiator grille 1, but since engaging concaves 24, 24 of clip 20 can escape as much as displacement quantity, deformation and damage as in the case of full securing by screws and the like can be avoided.

If detachment of radiator grille 1 is necessary, a minus driver or the like is inserted between nails 27 and 27 of elastic arms 22 and 22, expand them to pull radiator grille 1 this side and disengage engagement of engaging hole 12 with nails 27, 27, and radiator grille 1 can be detached.

Figure 10:
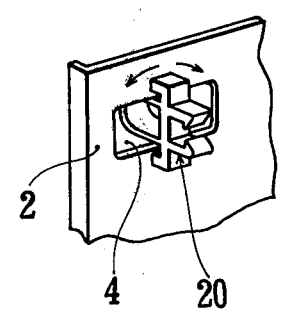
FIG. 10 is a sectional view for description of detaching the clip in Example 1.
Figure 14:
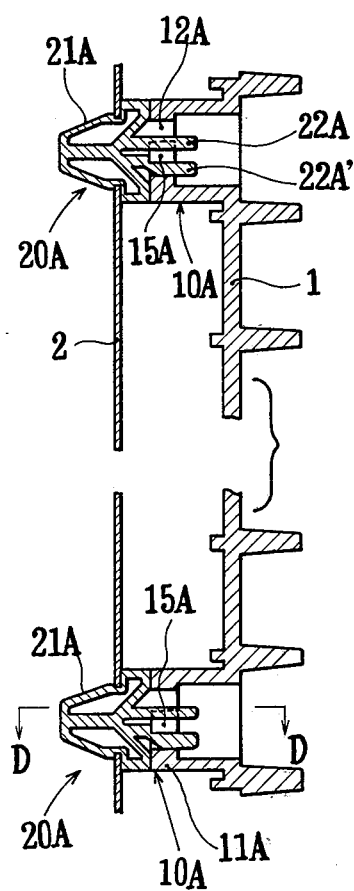
FIG. 14 is a sectional view showing a combining state in Example 2.

Clip 20 left behind bracket 2 can easily be pulled out of to-be-attached hole 4 by bending elastic head 21 or turning clip 20 by 90° and pulling down as shown in FIG. 10, because width W of to-be-attached hole 4 is wider then height H of engaging concave means 24, 24 on elastic head 21.

If reattachment of radiator grille 1 is necessary, attachment may be done after engaging clip 20 with engaging body 10 or with the state of clip 20 being attached to to-be-attached hole 4 engaging body 10 fitted into clip 20. In the latter case, however, the position of clip 20 must be previously adjusted.

EXAMPLE 2

This example will be illustrated in FIGS. 11 to 20.

Like Example 1 radiator grille 1 is integrally provided with an engaging body 10A made of the same material as the radiator grille 1 at an appropriate spot on the back surface. As shown in FIGS. 11, 13A and 13B, engaging body 10A is provided with an engaging hole 12A on a base portion 11A and at both right and left sides of back side of engaging hole 12A a pair of supporting plates 13A, 13A are projectingly arranged with the face thereof perpendicularly placed interposing a clearance 14A. Engaging hole 12A is provided with engaging pieces 15A, 15A and of H shape. And, supporting plates 13A, 13A are tapered at their top end and thickened and widened upwards and downwards at the base portion, thus having a stopper stepped means 16A, 16A.

That is, as shown in FIGS. 11, 12A and 12B, clip 20A has width to fit into clearance 14A of engaging body 10A, which comprises an elastic head 21A of closed ring heart form and a pair of elastic arms 22A, 22A projectingly elongated forward from the center base portion of elastic head 21A. On the upper and lower base portion of elastic head 21, engaging concave means 24A, 24A and stopper projection 26A, 26A of channel form are connectedly formed, wherein length between engaging concave means 24A, 24A shall be equal to height H of supporting plates 13A, 13A. While, one side of elastic arm 22A of elastic arms 22A, 22A is provided with a nail 27A on the top end portion and a narrow part 29A on the intermediate portion.

And, metal bracket 2 is arranged as Example 1, on which a to-be-attached hole 4 having dimension of height equal to height H of supporting plate 13A by width W longer than at least height H is opened.

Now, attachment of this example will be described.

First, clip 20A is inserted into clearance 14A of engaging body 10A integrated with radiator grille 1 from the side of elastic arms 22A, 22A, thereby elastic arms 22A, 22A are expanded by the slanting surface of engaging pieces 15A, 15A and bent toward the opposite direction and when nail 27A passes through engaging hole 12A, narrow part 29A fits into between engaging pieces 15A and 15A, elastic arms 22A, 22A restore, nail 27 is engaged with engaging pieces 15A, 15A and clip 20A engaged with engaging hole 12A.

Then, with this state, elastic head 21A of clip 20A is forcibly pushed into to-be-attached hole 4 of bracket 2 just contacting with the upper and lower edges of the hole, ring form elastic head 21A bends against elasticity and enters into to-be-attached hole 4 and reaches engaging concave means 24A, 24A, elastic head 21A restores the original form and, engaging body 10A and clip 20A are fixed unmovably to the front and rear by engagement of engaging concave means 24A, 24A with the upper and lower edges of to-be-attached hole 4 and unmovably to ups and downs by engagement of supporting plates 13A, 13A with the upper and lower edges of to-be-attached hole 4 and shakes to the front and rear is fully restricted by just contacting stopper stepped means 16A, 16A of supporting plates 13A, 13A with the front surface of bracket 2. Thus, when attachment of each clip 20A to to-be-attached hole 4 is completed, radiator grille 1 is no longer detached unless otherwise elastic head 21A or elastic arms 22A is forcibly deformed.

Radiator grille 1 attached as aforementioned is identical with Example 1 in holding function for loads in the upper, lower and horizontal directions upon radiator grille 1 as well as in absorbing function for expansion and contraction due to heat.

When pulling radiator grille 1 to this side, nail 27A of elastic arm 22A on one side engages with engaging pieces 15A, 15A on the center portion, so that it will not be disengaged unless otherwise elastic arm 22A deforms upward for the pulling load or nails 27A, 27A or engaging pieces 15A, 15A damage.

Figure 19:
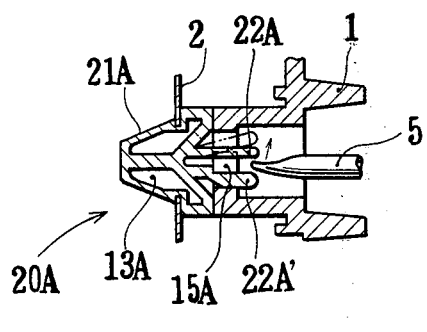
FIG. 19 is a sectional view for describing detachment of the radiator grille in Example 2.
Figure 20:
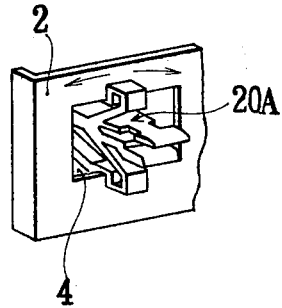
FIG. 20 is a perspective view for describing detachment of the clip in Example 2.

And, detachment of radiator grille 1 is identical with Example 1 as shown in FIGS. 19 and 20.

Figure 17:
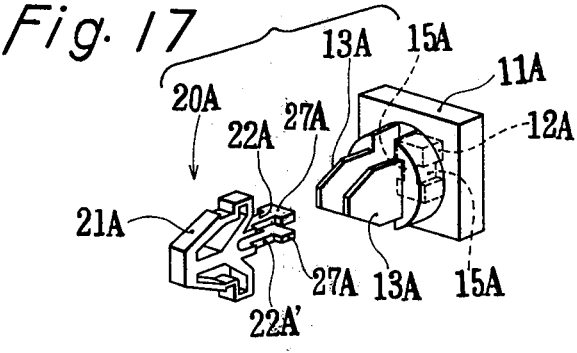
FIG. 17 is a perspective view of the clip and the engaging body having a nail on both elastic arms in Example 2.
Figure 18:
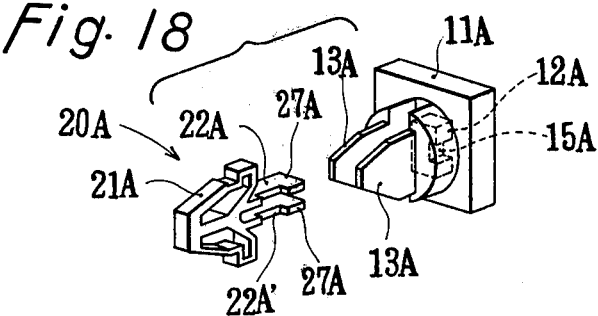
FIG. 18 is a perspective view of the clip and the engaging body having engaging piece on one side in Example 2.

And, in this example, nail 27A may be arranged on both elastic arms 22A and 22A as shown in FIG. 17 or engaging piece 15A may be arranged on one side alone with engaging hole 12A made channel form.

EXAMPLE 3

Figure 15:
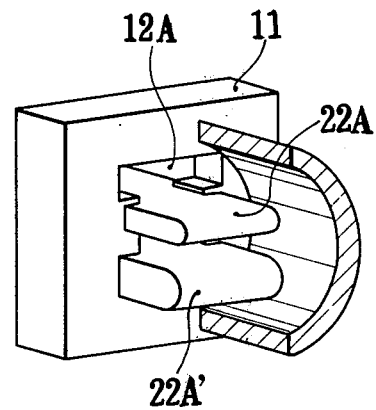
FIG. 15 is a perspective view showing combination of the clip and the engaging base portion in Example 2.
Figure 16:
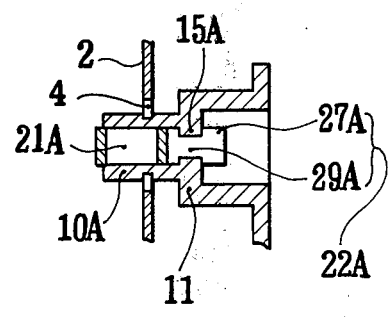
FIG. 16 is a sectional view through line D to D of FIG. 14.

In Example 2, as shown in FIG. 15, when looking radiator grille 1 from the front, clip 20A of elastic arms 22A, 22A is projectingly seen. This example aims at covering this appearance, which will be illustrated in FIGS. 21 to 23.

Figure 21:
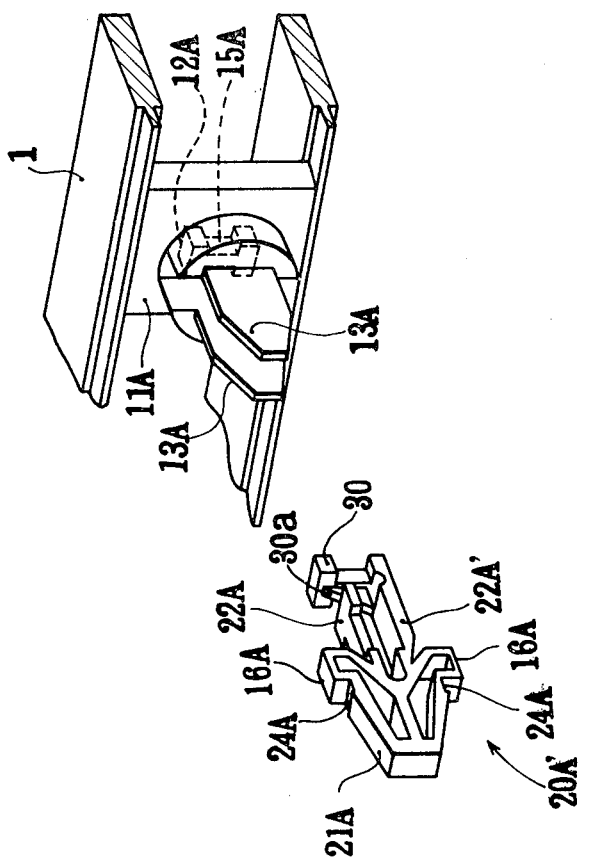
FIG. 21 is a fragmentary perspective view showing Example 3 of the present invention.

In Example 2, as shown in FIG. 21, on one side of elastic arms 22A, 22A, an arm covering plate 30 of H form in the illustration (channel form in FIG. 18), similar form able to be inserted into engaging hole 12A is arranged, on the reverse side of which an arm expanding nail 30a is arranged.

Then, the embodiment of this example will be described.

Figure 22:
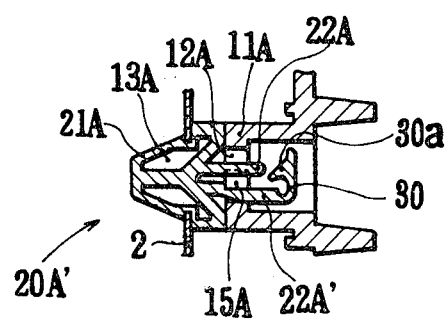
FIG. 22 is a sectional view showing the combining state in Example 3.

Attachment or detachment is identical with that of Example 2. However, the state of attachment becomes as shown in FIG. 22, wherein elastic arms 22A, 22A are out of sight from the front with arm covering plate 30 and arm covering plate 30 is also insensible because the form of arm covering plate 30 is similar to that of engaging hole 12A.

Figure 23:
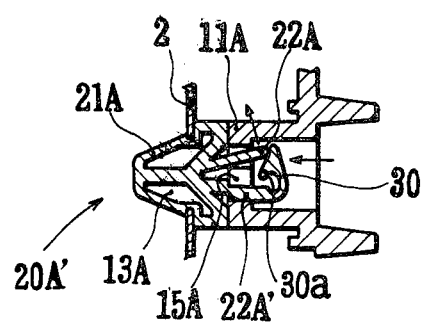
FIG. 23 is a sectional view for describing detachment of the clip from the engaging hole in Example 3.
Figure 27:
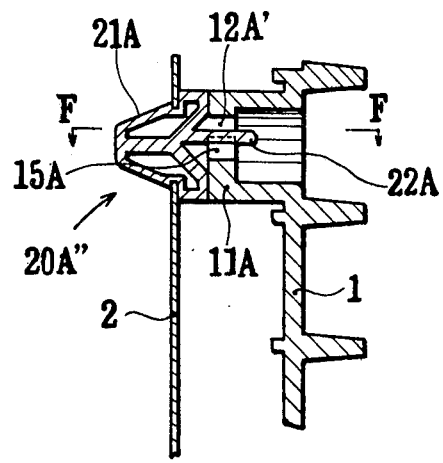
FIG. 27 is a sectional view showing the combining state in Example 4.
Figure 28:
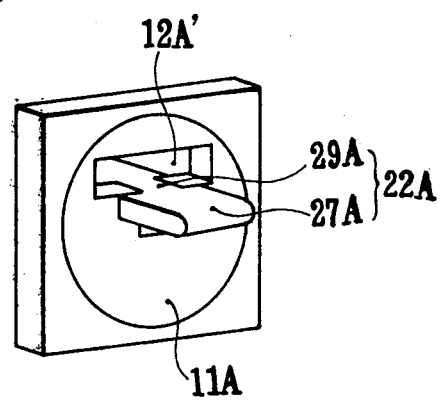
FIG. 28 is a perspective view showing combination of the clip and the grille in Example 4.
Figure 29:
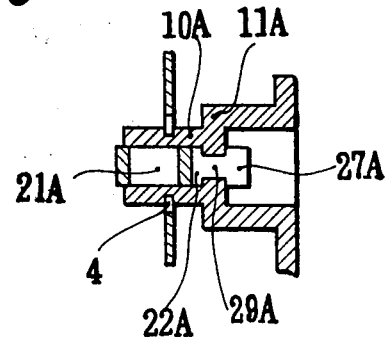
FIG. 29 is a sectional view through line F to F of FIG. 27.

And, in detachment, drivers and the like are unnecessary, but only with arm covering plate 30 pushed backward, as shown in FIG. 23, a gap between elastic arms 22A and 22A is easily widened by function of arm expanding nail 30a and radiator grille 1 can be removed from clip 20A.

EXAMPLE 4

This example will be illustrated in FIGS. 24 to 32, wherein the elastic arm will be single, elastic arm 22A and combining hole 12A will be T letter form in Example 2.

That is, describing more detail, a combining body 10A made of the same material as the grille is projectingly elongated toward bracket 2 and integrally formed at an appropriate spot on the reverse surface of radiator grille 1.

Combining body 10A comprises a base portion 11A and a pair of supporting plates 13A, 13A projected in parallel from the base portion 11A interposing a clearance 14A.

Base portion 11A has combining pieces 15A, 15A tapered to the side of supporting plate 13A at both sides of the lower end portion and a combining hole 12A of T letter form. Supporting plate has stopper stepped means 16A, 16A widened upward and downward at the base portion and tapered at the top end portion.

Radiator grille 1 integrally provided with combining body 10A at an appropriate spot is attached to bracket 2 through plastic clip 20A.

That is, clip 20A has, as shown in FIGS. 24 and 25, width to be inserted into between a pair of supporting plates 13A, 13A of combining body 10A and combining concave means 24A, 24A removably fitted into height H of to-be-attached hole 4 on the base portion of elastic head 21A of closed ring heart form, on which stopper projection 26A, 26A of channel form is elongated, wherein the face of the top end side of channel form becomes a contact surface for bracket 2 and the other face becomes a contact surface for base portion 11A on the grille side. Moreover, from the base center of elastic head 21A a narrow part 29A fitted into engaging pieces 15A, 15A of engaging hole 12A is formed and an elastic arm 22A is projectingly elongated. On top end portion of elastic arm 22A a nail 27A is formed.

A metal bracket 2 is, as shown in FIGS. 3 and 24, arranged at the position opposite to engaging body 10A on the aforementioned grille side with the front face of the radiator and a to-be-attached hole 4 is opened with height equal to those of engaging hole 12A and engaging concave means 24A, 24A of clip 20A and width W longer than at least that of stopper projection 26A, 26A of clip 20A.

Next, combination of this example will be described.

First, clip 20A is pushed into a gap between a pair of supporting plates 13A, 13A of engaging body 10A of radiator grille 1 from elastic arm 22A. Then, clip 20A is pushed into engaging hole 12A and the lower face of nail 27A is forcibly pushed upward by the slanting surface of engaging piece 15A and elastic arm 22A bends upward and passes through engaging hole 12A, wherein narrow part 29A fits into between engaging pieces 15A, 15A of engaging hole 12A. When pushed into a specified position, the part is stopped with a face of channel form of stopper projection 26A of clip 20A and a face of base portion 11A of engaging body 10A. Clip 20A is held between supporting plates 13A, 13A mostly fitted thereinto.

Now, with this state, elastic head 21 of clip 20A is forcibly pushed into to-be-attached hole 4 of bracket 2, with it contacted with the upper and lower edges thereof, and when elastic head 21A of ring form bends against elasticity, enters into to-be-attached hole 4 and reaches stopper projection 26A, 26A, elastic head 21 restores the original form and fixed by engaging force of stopper projection 26A, 26A, supporting plates 13A, 13A of engaging body 10A and the upper and lower edges of to-be-attached hole 4.

Thus, when attachment of each clip 21A to to-be-attached hole 4 is completed, radiator grille 1 is securely held by bracket 2. After attachment, radiator grille 1 will no longer be detached unless otherwise elastic head 21A or elastic arm 22A is forcibly deformed.

Loads in the upper, lower and horizontal directions upon radiator grille 1 attached as the aforementioned is received by frictional fitting force with supporting plate 13A of engaging body 10A, so that to-be-attached hole 4 and radiator grille 1 will not be displaced or out of position due to vibration and the like during running cars.

Particularly for loads in the upper and lower directions, supporting plate 13A accepts all the loads and clip 20A is never subjected to loads, so that clip 20A will not be deformed by the loads and radiator grille 1 will not be out of position. When pulling grille 1 to this side, elastic arm 22A exists in the center portion and engaging body 10A of the grille comes to the center portion, so that elastic arm 22A will not be deformed in the upper and lower directions by the pulling load and nail 27A will not be disengaged with engaging hole 12A of engaging body 10A unless otherwise engaging hole 12A or nail 27A is damaged.

When radiator grille 1 tends to expand or contract in the longitudinal direction due to heat, clip 20A itself is clipped by a pair of supporting plates 13A, 13A of engaging body 10A on the grille side and integrally displaced in the direction of expansion or contraction of radiator grille 1, but stopper projection 26A of clip 20a can escape as much as displacement quantity with respect to to-be-attached hole 4, so that deformation or damage as in the case of full engagement with screws and the like can be avoided.

Figure 30:
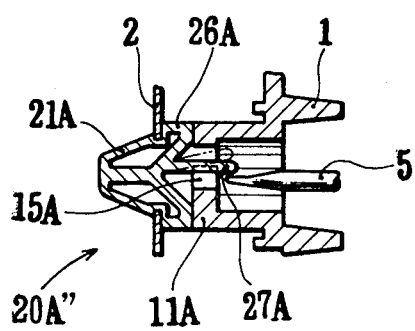
FIG. 30 is a sectional view for describing detachment of the radiator grille in Example 4.

If detachment of radiator grille is necessary, as shown in FIG. 30, insert minus driver 5 or the like into a gap between elastic arm 22A and engaging body 10A, deform nail 27A in the upper direction and pull radiator grille 1 to this side and disengage engagement between engaging hole 12A and nail 27 in engaging body 10A, and the grille can be detached.

Figure 31:
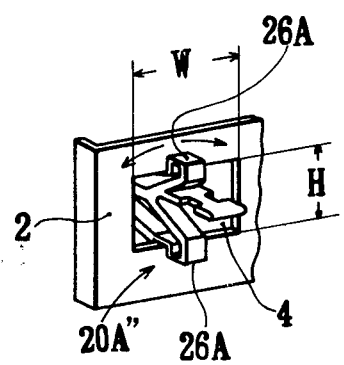
FIG. 31 is a perspective view for describing detachment of the clip in Example 4.

Clip 20A left behind bracket 2 can be easily taken out of to-be-attached hole 4 if elastic head 21A is bent and pulled out of to-be-attached hole 4 or if clip 20A is turned by 90° and pulled down as shown in FIG. 31, because width W of to-be-attached hole 4 is wider than that between stopper projections 26A, 26A of clip 20A.

If reattachment of radiator grille 1 is necessary, with the same manner as the aforementioned, attachment may be done after engaging clip 20A with engaging body 10A or with the state of attaching clip 20A to to-be-attached hole 4 engaging body 10A may be fitted into clip 20A. And, in the latter case, the position of each clip must be previously adjusted.

Figure 32:
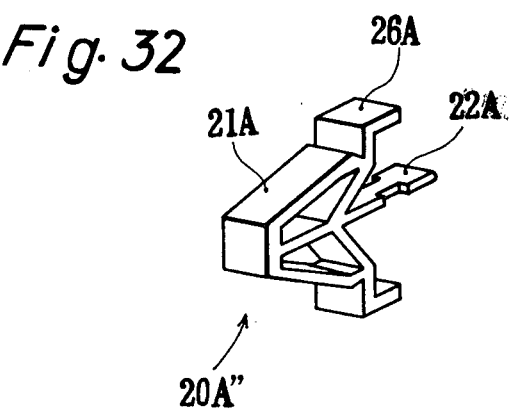
FIG. 32 is an entire perspective view of the clip which stopper stepped portion altered in shape in Example 4.

And, FIGS. 32 shows stopper projection 26A of clip 20A, which is formed of L letter form.

EXAMPLE 5

This example is structure for attaching sheeting and illustrated in FIGS. 33 to 41.

Figure 33:
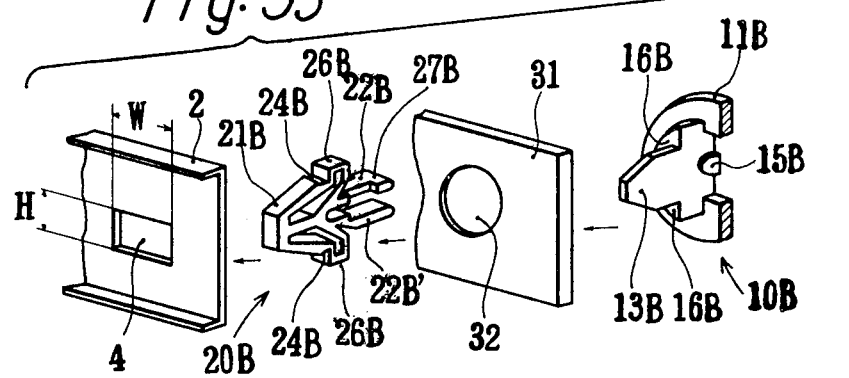
FIG. 33 is a fragmentary perspective view showing Example 5 of the present invention.
Figure 34:
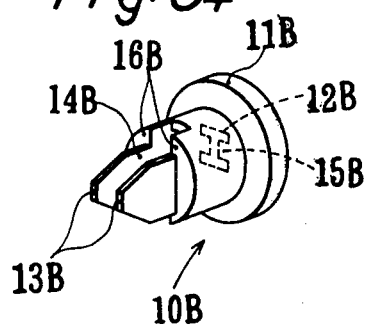
FIG. 34 is an entire perspective view of the engaging body in Example 5.
Figure 35:
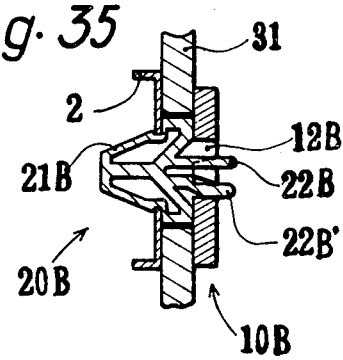
FIG. 35 is a sectional view showing the combining state in Example 5.

As shown in FIG. 33, open a to-be-attached hole 4 on a bracket 2 at an appropriate intervals and a combining hole 32 on sheeting 31 in long length at corresponding intervals with the former, insert a supporting plate 13B of a engaging body 10B and an elastic head 21B of clip 20B into combining hole 32, thus holding sheeting 31 between bracket 2 and a base portion 11B of engaging body 10B, wherein form of engaging body 10B and clip 20B is like that of Example 2 as aforementioned, base portion 11B of engaging body 10B is formed to be larger diameter than combining hole 32 of sheeting 31.

Then, the embodiment of this example will be described.

First, forcibly push elastic head 21B of clip 20B into to-be-attached hole 4 with the state of just contacting the head with the upper and lower edges of the hole, and engaging concave means 24B, 24B engage with the upper and lower edges of to-be-attached hole 4 and hold clip 20B in bracket 2.

Next, through engaging hole 32 of sheeting 31, put sheeting 31 on stopper projection means 26B, 26B of clip 20B held in bracket 2 so as to just contact with a face of bracket 2.

And, insert engaging body 10B into engaging hole 32 of sheeting 31 and to-be-attached hole 4 of bracket 2 so as to hold clip 20B between a pair of supporting plates 13B, 13B of engaging body 10B, and nail 27B engages with engaging hole 12B and engaging body 10B is held in clip 20B like the case in Example 2.

Then, since the diameter of base portion 11B of engaging body 10B is larger than that of combining hole 32 of sheeting 31, it is caught between bracket 2 and engaging body 10B and attached to bracket 2.

And, when detaching, pull engaging body 10B to this side so as to push the top end of elastic arm 22B of clip 20B with the tip of the driver and the like, and narrow part 29B of elastic arm 22B is disengaged with engaging hole 12B and engaging body 10B is taken out of clip 20B.

Further, when detaching clip 20B from bracket 2, incline clip 20B either to the right or left by 90°, detachment may be simply done because width W of to-be-attached hole 4 is made larger than length between concave means 24B and 24B.

Figure 36:
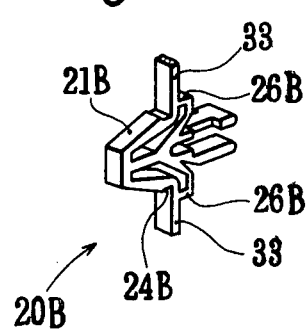
FIG. 36 is a perspective view of the clip provided with clipping projection in Example 5.
Figure 37:
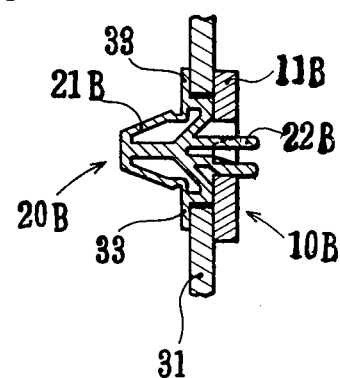
FIG. 37 is a sectional view showing the combining state of sheeting with the clip in Example 5.

And, as shown in FIG. 36, holding pieces 33, 33 are formed in continuous to engaging concave means 24B, 24B at the end of stopper projection means 26B, 26B, and as shown in FIG. 37, sheeting 31 is held between holding pieces 33, 33 of clip 20B and base portion 11B of engaging body 10B as aforementioned, sheeting 31, clip 20B and engaging body 10B are portable with one body and very convenient.

Figure 38:
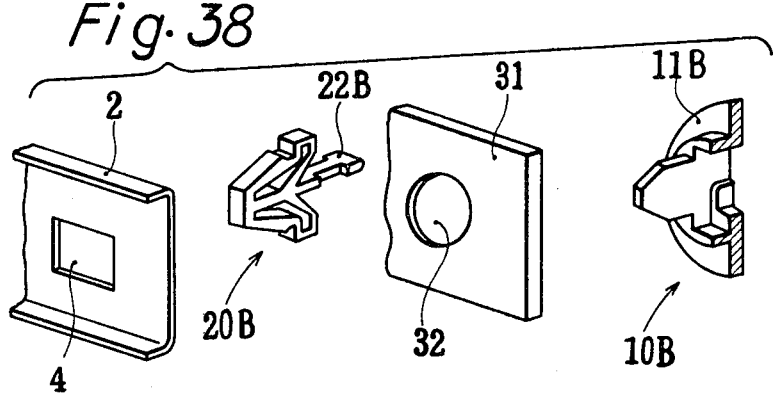
FIG. 38 is a fragmentary perspective view of the elastic arm comprising one arm in Example 5.

And, as shown in FIG. 38, with a single piece of elastic arm 22B, sheeting 31 can be attached to as aforementioned.

Figure 40:
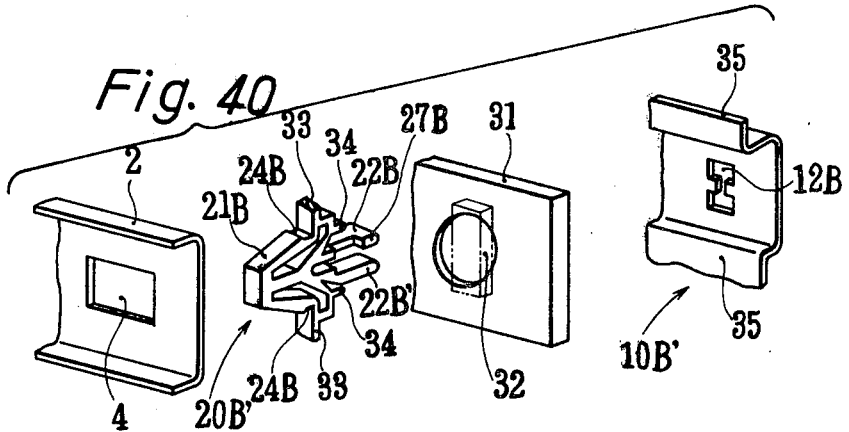
FIG. 40 is a fragmentary perspective view showing that the engaging body is of a separate type in Example 5.
Figure 39:
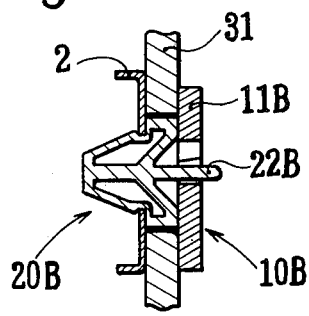
FIG. 39 is a sectional view showing the combining state of FIG. 38.
Figure 41:
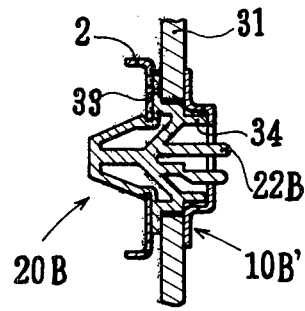
FIG. 41 is a sectional view showing the combining state of FIG. 40.

And, sheeting 31 may be attached as shown FIG. 40 that holding pieces 33, 33 are projectingly arranged at the end of stopper projection means 26B, 26B in continuous to engaging concave means 24B, 24B of clip 20, or as shown in FIG. 41 that instead of engaging body 10B, an engaging body 10B having flange means 35, 35 and an engaging hole 12B on the bottom surface at an appropriate intervals as arranged on engaging body 10B is formed. And, combining hole 32 may be formed of rectangular as shown with a 2-point dotted chain line.

With structure as aforementioned the present invention has effect as below:

(1) In cases of Examples 1 to 4, wherein plastic attaching member is attached to metal to-be-attached member with the clip means regarding expansion and contraction due to heat, so that there is no fear of deformation and damage due to heat.

(2) In case of Examples 1 to 5, attachment or detachment can be done by one touch action, fixing force after engagement does not differ from that of screw means and there is no fear that detachment becomes impossible or the fine view is hurted with rust as that of screwing.

(3) In case of Example 3, appearance improves in attachment compared with that of Examples 1 and 2 and detachment of the attaching member from the to-be-attached member becomes easier.

(4) In case of Example 5, sheeting of long length can be easily detached even at a narrow place.

As aforementioned, although description has been made out with combination of the plastic radiator grille and metal construction as an example, this, of course, can be effectively applied to various plastic construction in cars and others. And, although particularly with the combination of plastic construction and metal to-be-attached construction effective combining construction is available in absorbing expansion and contraction actions due to heat passage, it is obvious from the aforementioned construction that two bodies are not restricted in material.

What I claim is:

1. A device for combining two bodies, one of said bodies having an attaching hole therein, said device comprising:
   (a) an engaging body attached to the other of said bodies, said engaging body including a first base portion, an engaging hole at the center of said first base portion, an engaging portion, and a pair of supporting plates projecting from said first base portion; and
   (b) a clip, said clip including a second base portion, head means extending from said second base portion, said head means being insertable between said supporting plates, engaging concave means adjacent said head, and at least one arm means projecting from said second base portion in a direction opposite to said head means, said arm means having a nail means for engaging said engaging portion of said engaging body;
   wherein when said bodies are attached, said concave means are held in said attaching hole, thereby attaching one of said bodies to said clip and said clip is held in said engaging body by the engagement of said nail means and said engaging portion.

2. A device as set forth in claim 1 wherein said at least one arm means is two arm means, each of said arm means having a nail means at the end thereof.

3. A device as set forth in claim 1 wherein said at least one arm means is one arm means having a nail means at the end thereof.

4. A device as set forth in claim 3 including a second arm means, said second arm means not having a nail means thereon.

5. A device as set forth in claim 1 wherein said at least one arm means is one arm means having a nail means thereon and a covering plate attached to said arm means and said nail.

6. A device as set forth in claim 1 wherein said engaging hole has upper and lower portions parallel to each other and a central portion connecting said upper and lower portions and perpendicular thereto.

7. A device as set forth in claim 1 wherein said engaging hole has a first portion and a second portion perpendicular to said first portion.

* * * * *